(12) United States Patent
Li et al.

(10) Patent No.: US 6,535,268 B1
(45) Date of Patent: Mar. 18, 2003

(54) MULTILAYER NON METALLIC REFLECTING FLAKES FOR COSMETICS AND SUNSCREENS

(75) Inventors: Le Li, Yorktown Heights, NY (US); Sadeg Faris, Pleasantville, NY (US)

(73) Assignee: Reveo, Inc., Elmsford, NY (US)

( * ) Notice: Subject to any disclaimer, the term of this patent is extended or adjusted under 35 U.S.C. 154(b) by 0 days.

(21) Appl. No.: 09/504,051

(22) Filed: Feb. 14, 2000

Related U.S. Application Data

(63) Continuation-in-part of application No. 09/039,303, filed on Mar. 14, 1998, now abandoned, which is a continuation-in-part of application No. 08/805,603, filed on Feb. 26, 1997, now Pat. No. 5,940,150, which is a continuation-in-part of application No. 08/739,467, filed on Oct. 29, 1996, now Pat. No. 6,034,753, which is a continuation-in-part of application No. 08/550,022, filed on Oct. 30, 1995, now Pat. No. 5,691,789.

(51) Int. Cl.[7] ............................................. G02F 1/133
(52) U.S. Cl. ........................ 349/176; 427/212; 428/402
(58) Field of Search ........................ 106/31.04, 31.32, 106/31.33, 31.64, 65, 415; 349/176, 175, 193; 428/402; 427/212, 215, 220

(56) References Cited

U.S. PATENT DOCUMENTS

| | | | | |
|---|---|---|---|---|
| 4,200,360 A | * | 4/1980 | Mutzhas | 359/359 |
| 4,205,115 A | * | 5/1980 | Piccirilli et al. | 428/334 |
| 4,971,841 A | * | 11/1990 | Panush et al. | 428/458 |
| 5,059,245 A | * | 10/1991 | Phillips et al. | 106/22 |
| 5,064,641 A | * | 11/1991 | Lang et al. | 424/60 |
| 5,137,575 A | * | 8/1992 | Yasuki et al. | 106/441 |
| 5,362,315 A | * | 11/1994 | Muller-Rees et al. | 106/493 |
| 5,367,557 A | * | 11/1994 | Faris | 252/299.01 |
| 5,398,131 A | * | 3/1995 | Hall et al. | 359/465 |
| 5,415,950 A | * | 5/1995 | King et al. | 430/2 |
| 5,455,048 A | * | 10/1995 | Lahmani et al. | 424/490 |
| 5,609,852 A | * | 3/1997 | Galley et al. | 424/59 |

\* cited by examiner

*Primary Examiner*—Kenneth Parker
(74) *Attorney, Agent, or Firm*—Rodney T. Hodgson; Ralph J. Crispino

(57) ABSTRACT

A material for protection against injurious ambient light composed of a binder mixed with non metallic reflective flakes is disclosed.

49 Claims, 1 Drawing Sheet

MULTILAYER NON METALLIC REFLECTING FLAKES FOR COSMETICS AND SUNSCREENS

CROSS-REFERENCE TO RELATED APPLICATIONS

The present application is a continuation in part of application Ser. No. 09/039,303 filed Mar. 14, 1998 (now abandoned) entitled Multilayer Reflective Films having Non-linear spacing of layers which is a continuation in part of application Ser. No. 08/805,603 (now U.S. Pat. No. 5,940,150) entitled "Electro-optical glazing structures having total-reflection and transparent modes of operation for use in dynamical control of electromagnetic radiation" by Sadeg M. Faris and Le Li, filed Feb. 26, 1997, which is a continuation-in-part of: application Ser. No. 08/739,467 (now U.S. Pat. No. 6,034,753) entitled "Super Broadband Reflective Circularly Polarizing Material And Method Of Fabricating And Using Same In Diverse Applications", by Sadeg M. Faris and Le Li filed Oct. 29, 1996, which is a is a Continuation-in-Part of application Ser. No. 08/550,022 (Now U.S. Pat. No. 5,691,789) entitled "Single Layer Reflective Super Broadband Circular Polarizer and Method of Fabrication Therefor" by Sadeg M. Faris and Le Li filed Oct. 30, 1995. Each of the above identified Applications and patents are commonly assigned to the assignee of the present invention, and are incorporated herein by reference in their entirety.

FIELD OF THE INVENTION

The field of the invention is the field of protective coatings for protecting surfaces from injurious ambient light.

BRIEF DESCRIPTION OF THE LITERATURE

Broadband reflecting polarizers were introduced in application Ser. No. 08/550,022 (now U.S. Pat. No. 5,691,789) entitled "Single Layer Reflective Super Broadband Circular Polarizer and Method of Fabrication Therefor" by Sadeg M. Faris and Le Li which was filed Oct. 30, 1995. Such broadband polarizers are made by producing a single layer having cholesteric liquid crystal order where the pitch of the liquid crystal order varies in a non linear fashion across the layer.

General references on polymer dispersed liquid crystals may be found in detail in "Polymer Dispersed Liquid crystal displays", by J. W. Doane, a chapter in "Liquid Crystals", Ed. B. Bahadur, World Scientific Publishing, Singapore, and "CLC/polymer dispersion for haze-free light shutters, by D. Yang et al. Appl. Phys. Lett. 60, 3102 (1992).

Since the early attempt of utilizing cholesteric film as optical filters and the effort on polymer encapsulated nematic liquid crystals for display, much attention has been focused on trying to bring polymeric liquid crystals and cholesteric liquid crystals together to make devices for light control application. (See, for example J. Adams, W. Hass, J. Dailey, Journal of Applied Physics, 1971, and J. L. Fergason, Society for Information Display Digest, 1985.).

The following applications are related to the present invention: application Ser. No. 9/093,017 filed Jun. 5, 1998; application Ser. No. 09/093,006 filed May 5, 1998; application Ser. No. 09/039,303 filed Mar. 14, 1998; application Ser. No. 09/039,297 filed Mar. 14, 1998; application Ser. No. 08/891,877 filed Jul. 9, 1997 entitled "Reflective Film Material Having Symmetrical Reflection Characteristics and Method and Apparatus for Making the Same", by Le Li and Sadeg Faris; application Ser. No. 08/739,467 filed Oct. 29, 1996 entitled "Circularly Polarizing Reflective Material Having Super Broad-Band Reflecting & Transmission Characteristics & Method of Fabricating & Using Same in Diverse Applications" by Sadeg M. Faris, Le Li, and Yingqiu Jiang Jiang; application Ser. No. 08/890,320 filed Jul. 9, 1997 entitled "Coloring Media Having Improved Brightness and Color Characteristics" by Sadeg M. Faris and Le Li; The above identified US patents and other references are hereby incorporated by reference.

BACKGROUND OF THE INVENTION

Protection of surfaces from injurious effects of ambient light has heretofore generally used materials which absorbed the injurious light. Organic molecules used as sunscreens are chosen to have a very strong absorption in a particular band. For example, the absorption in the UVA band. Unfortunately, the absorption is usually not great in additional bands such as the UVB band. Unfortunately, the materials which absorb injurious light also tend to be "injured" by the light. For example, organic molecules applied to the skin as sunscreen tend to break down when subjected to strong ultraviolet light for a long time. In addition, such materials added to plastics and fabrics tend also to have limited life. Reflecting and scattering materials, such as zinc oxide used in sunscreens, tend to reflect and scatter visible light also, which leads to the faintly comical "white noses" familiar on lifeguards.

OBJECTS OF THE INVENTION

It is an object of the invention to provide a protective material which protects the surface of a material from injurious ambient light. It is a further object of the invention to provide a protective material which reflects the injurious ambient light. It is a further object of the invention to provide a protective material which is transparent in the visible spectral region. It is a further object of the invention to provide a protective material which reflects injurious ultraviolet light. It is a further object of the invention to provide a protective material which reflects both injurious ultraviolet light and infrared light. It is a further object of the invention to provide a protective material which acts as a sunscreen for human skin and which is not visible in visible light.

SUMMARY OF THE INVENTION

Non metallic, reflecting flakes of multilayer polymer, CLC, or inorganic material are used with a binder to form a protective coating on a material surface. The flakes reflect light in a spectral range where the light is injurious to the material surface, and transmit light in a spectral range where the light is not injurious to the material surface.

DETAILED DESCRIPTION OF THE INVENTION

Figure 1:
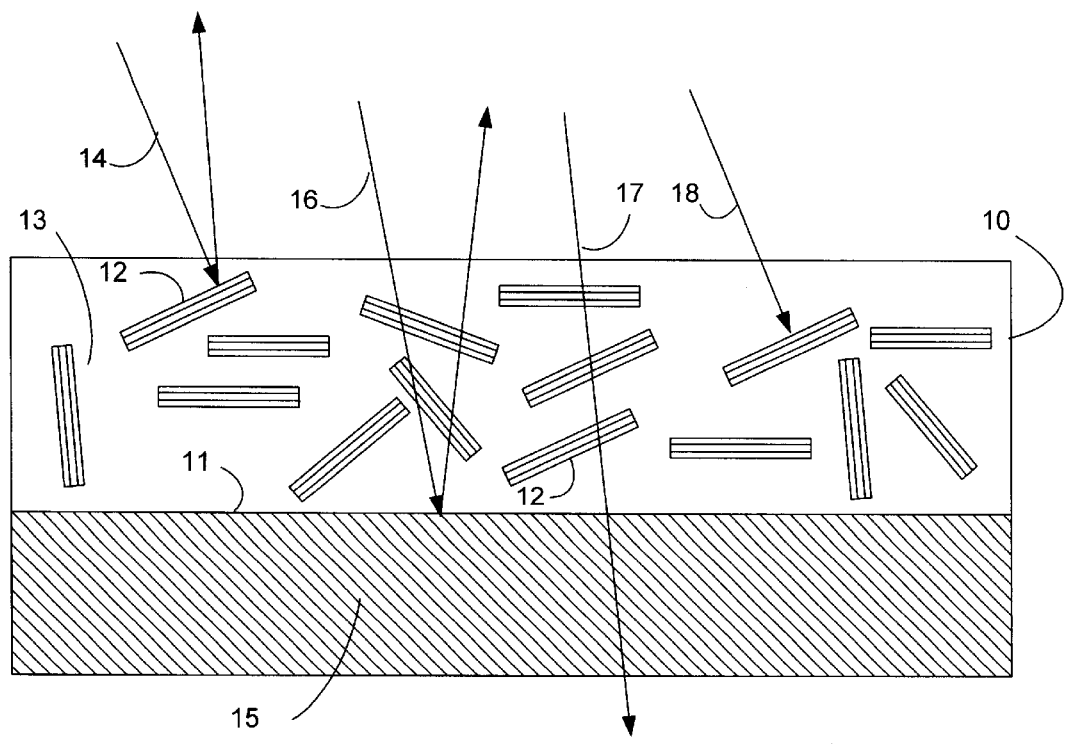
FIG. 1 is a sketch of the material of the invention.

FIG. 1 shows a sketch of a layer 10 of the protective material of the invention covering a surface 11 of a material 15 which is to be protected from injurious ambient light. Layer 10 comprises non metallic reflecting flakes 12 imbedded in a binder material 13. Light rays 14 of light in a spectral region which would be injurious to material 15 are shown reflecting from a non metallic reflecting flake 12. In a preferred embodiment of the invention, flakes 12 are transparent in a spectral region for which light is not injurious to the material 15, and such light rays 16 are shown passing through a flake 12 where they strike the surface 11 of the material and are reflected from the surface 11 of the material 15. In particular, light rays 14 may be ultraviolet light, for example ultraviolet light in the WVA, UVB, or both UVA and UVB spectral ranges, and light rays 16 may be in the visible region. By convention, the UVA spectral range has wavelength in the range 320–400 nm, and the UVB spectral range is 280–320 nm. In addition, injurious light rays 14 may be in the infrared spectral range where the infrared light rays 14, if they struck the surface 11 of the material 15 would be absorbed in the material 15 and heat the material 15 in an unacceptable manner. Each flake 12 may reflect all injurious light, or different flakes reflecting different spectral regions may be admixed in binder material 13 so that little or no injurious light may propagate to the surface 11. The material 15 in one preferred embodiment is transparent to the non injurious light rays. One such light ray 17 is shown passing through the binder material 13, non metallic reflecting flake 12, the surface 11, and the material 15. In a preferred embodiment, transparent material 15 is used as a food covering, and the layer 10 keeps injurious ultraviolet light from the food surface. In an additional embodiment, layer 10 reflects infrared light and keeps the food product colder. In an additional embodiment, transparent material 15 is used for greenhouses to protect growing plants from harmful UV and IR light.

The binder material 13 in one preferred embodiment absorbs injurious light rays as indicated by light ray 18. Such absorption is useful, in that very high absorptions may be obtained, for example in the UVA spectral region, while the flakes take care of the surface by reflecting the UVB spectral region. Alternatively, the flakes may reflect the UVA spectral region, while the binder material 13 absorbs light in the UVB spectral region. Alternatively, the binder material may absorb light in both the UVA and UVB spectral regions, while the flakes 12 reflect light in the IR spectral region.

The most preferred embodiment of the invention is the use of the material of the invention as a sunscreen for human skin and human fingernails.

In other preferred embodiments, the materials 15 to be protected are textile, polymer, leather, wood, metal, brick, stone, concrete, glass, paper, ice, rubber, paint, tar, or ink material.

Reflecting flakes 12 may be cholesteric liquid crystal (CLC) flakes, multilayer polymeric material flakes, or inorganic multilayer material flakes. Such flakes have high reflectivity in a particular spectral region because they are composed of many layers of alternating high and low index of refraction material. In order that the flakes may reflect light over a broad bandwidth, the thickness of the layers may be a non linear function of the distance from the layer to the surface of the flake as shown in great detail in the incorporated U.S. Pat. No. 5,691,789 and in incorporated application Ser. No. 09/039,303.

Obviously, many modifications and variations of the present invention are possible in light of the above teachings. It is therefore to be understood that, within the scope of the appended claims, the invention may be practiced otherwise then as specifically described.

We claim:

1. A material for protecting a surface of a material from injurious ambient light, comprising:

non-metallic reflecting flakes of multilayer materials where the thickness of the layers is a non linear function of the distance from the layer to the surface of the flake, the flakes reflecting the ambient light over a first spectral range wherein the light is injurious to the surface; and a binder material to bind the non-metallic reflecting flakes to the surface.

2. The material of claim 1, wherein the reflecting flakes are cholesteric liquid crystal (CLC) flakes.

3. The material of claim 1, wherein the reflecting flakes are multilayer polymeric material flakes.

4. The material of claim 3, wherein the reflecting flakes are multilayer materials where the thickness of the layers is a non linear function of the distance from the layer to the surface of the flake.

5. The material of claim 1, wherein the reflecting flakes are inorganic multilayer material flakes.

6. The material of claim 5, wherein the reflecting flakes are multilayer materials where the thickness of the layers is a non linear function of the distance from the layer to the surface of the flake.

7. The material of claim 1, wherein the first spectral range is the UVA spectral range.

8. The material of claim 7, wherein binder material absorbs ambient light in the UVB spectral range.

9. The material of claim 7, wherein material is transparent in the visible spectral range.

10. The material of claim 1, wherein the first spectral range is the UVB spectral range.

11. The material of claim 10, wherein binder material absorbs ambient light in the UVA spectral range.

12. The material of claim 10, wherein material is transparent in the visible spectral range.

13. The material of claim 1, wherein the first spectral range is the UVA and the UVB spectral range.

14. The material of claim 1, wherein the first spectral range is the near infrared spectral range.

15. The material of claim 14, wherein the first spectral range also includes the UVA and the UVB spectral range.

16. The material of claim 15, wherein material is transparent in the visible spectral range.

17. The material of claim 1, wherein the reflecting flakes are multilayer materials where the thickness of the layers is a non linear function of the distance from the layer to the surface of the flake.

18. The material of claim 1, wherein the surface is human skin surface.

19. The material of claim 18, wherein material is transparent in the visible spectral range.

20. The material of claim 19, wherein the first spectral range is the UVA spectral range.

21. The material of claim 20, wherein binder material absorbs ambient light in the UVB spectral range.

22. The material of claim 19, wherein the first spectral range is the UVB spectral range.

23. The material of claim 22, wherein binder material absorbs ambient light in the UVA spectral range.

24. The material of claim 19, wherein the first spectral range is the UVA and the UVB spectral range.

25. The material of claim 19, wherein the first spectral range is the near infrared spectral range.

26. The material of claim 25, wherein the first spectral range also includes the UVA and the UVB spectral range.

27. The material of claim 1, wherein the surface is the surface of a textile.

28. The material of claim 1, wherein the surface is the surface of a polymeric material.

29. The material of claim 1, wherein the surface is the surface of leather.

30. The material of claim 1, wherein the surface is the surface of wood.

31. The material of claim 1, wherein the surface is the surface of a food product.

32. The material of claim 1, wherein the surface is the surface of a covering, the covering transparent in the visible spectral region.

33. The material of claim 32, wherein the surface is the surface of a transparent covering for food products.

34. The material of claim 1, wherein the surface is the surface of a fingernail.

35. The material of claim 1, wherein the surface is a plastic surface.

36. The material of claim 1, wherein the surface is the surface a visibly transparent material for a greenhouse.

37. The material of claim 1, wherein the surface is the surface of metal.

38. The material of claim 1, wherein the surface is the surface of brick.

39. The material of claim 1, wherein the surface is the surface of stone.

40. The material of claim 1, wherein the surface is the surface of concrete.

41. The material of claim 1, wherein the surface is a glass surface.

42. The material of claim 1, wherein the surface is a paper surface.

43. The material of claim 1, wherein the surface is an ice surface.

44. The material of claim 1, wherein the surface is the surface of a plant.

45. The material of claim 1, wherein the surface is a rubber surface.

46. The material of claim 1, wherein the surface is the surface of an ink coated object.

47. The material of claim 1, wherein the surface is a painted surface.

48. The material of claim 1, wherein the surface is a tar coated surface.

49. The material of claim 1, wherein the surface is a road surface.

* * * * *